United States Patent [19]
Geib

[11] Patent Number: 6,149,693
[45] Date of Patent: Nov. 21, 2000

[54] HYDROCARBON GELS USEFUL IN FORMATION FRACTURING

[75] Inventor: George Gregory Geib, Liberty, S.C.

[73] Assignee: Ethox Chemicals, Inc., Greenville, S.C.

[21] Appl. No.: 08/596,080

[22] Filed: Feb. 6, 1996

[51] Int. Cl.$^7$ .............................. C10L 7/00; C09K 3/32; E21B 43/16; E21B 43/26
[52] U.S. Cl. ............................ 44/270; 507/238; 507/239; 507/246; 507/269; 507/271; 507/922
[58] Field of Search ................................ 252/544, 183.13, 252/315.01; 564/507; 166/292, 300, 308; 44/268, 270; 106/285; 507/238, 239, 246, 269, 271, 922

[56] References Cited

U.S. PATENT DOCUMENTS

| | | | |
|---|---|---|---|
| 2,983,678 | 5/1961 | Pellegrini, Jr. et al. | 252/32.5 |
| 3,494,949 | 2/1970 | Monroe et al. | 260/448 |
| 4,135,878 | 1/1979 | Bishop et al. | 8/139 |
| 4,153,649 | 5/1979 | Griffin, Jr. | 260/950 |
| 4,316,810 | 2/1982 | Burnham | 252/8.55 R |
| 4,622,155 | 11/1986 | Harris et al. | 252/8.551 |
| 5,110,485 | 5/1992 | Huddleston | 252/8.551 |
| 5,271,464 | 12/1993 | McCabe | 166/295 |
| 5,417,287 | 5/1995 | Smith et al. | 166/308 |
| 5,460,753 | 10/1995 | Holdar | 252/544 |
| 5,516,341 | 5/1996 | Farng et al. | 44/331 |

FOREIGN PATENT DOCUMENTS

| | | | |
|---|---|---|---|
| 0 551 021 A1 | 7/1993 | European Pat. Off. | E21B 43/26 |

*Primary Examiner*—Barbara Badio
*Attorney, Agent, or Firm*—Isaac Angres; Cort Flint

[57] ABSTRACT

Liquid hydrocarbons are gelled by the introduction of a phosphate ester and a crosslinking agent. Gelling times and viscosities are improved through the use of an enhancer which is, preferably, an oxyalkylated amine or a blend of an oxyalkylated amine with another amine or a non-nitrogen-containing component. Preferred phosphate esters are ether phosphate esters.

18 Claims, No Drawings

HYDROCARBON GELS USEFUL IN FORMATION FRACTURING

FIELD OF THE INVENTION

Generally, the present invention is directed to the improved gellation of hydrocarbons liquids for a variety of applications. The present invention is specifically directed to an enhancer for improving the gelling of hydrocarbon liquids when treated with phosphate esters and crosslinking agents.

BACKGROUND OF THE INVENTION

In order to maximize the amount of oil derived from an oil well a process known as hydraulic pressure stimulation or, more commonly, formation fracturing is often employed. Generally, a fluid is pumped under high pressure down the wellbore through a steel pipe having small perforations in order to create or perpetuate cracks in the adjacent rock. The fluid employed must be able withstand exceptionally high shear forces. Gelled liquids, particularly gelled hydrocarbons, are often employed. In gelling the hydrocarbon on-site it is also preferred that gellation occur as quickly as possible.

Rapid gellation of hydrocarbon liquids is also required when tanks or vessels containing such liquids are damaged during transit to avoid or reduce spillage and the resultant damage to the environment.

A variety of other applications exist which require the rapid gellation of hydrocarbon liquids. Therefore, several means for gelling hydrocarbon liquids are disclosed in the prior art.

U.S. Pat. No. 5,417,287 to Smith et al. is directed to a method for fracturing a subterranean formation which involves adding to a hydrocarbon liquid (a) an organic phosphate of the formula $HPO_4RR'$ where R is an alkyl or alkaryl group having from 6 to 18 carbon atoms and R' is hydrogen or an aryl, alkaryl, or alkyl group having from 1 to 18 carbon atoms; and (b) a ferric salt.

European Patent Application No. 551021A1 to McCabe et al. is directed to gelling a hydrocarbon liquid by adding thereto an at least partially neutralized alkyl orthophosphate acid ester, a $C_8$–$C_{18}$ surface active amine and a $C_2$–$C_4$ monohydric alcohol. The surface active amine employed includes alkyl and alkanol amines having from about 8–18 carbon atoms, N-heterocyclic amines, alkyl substituted derivatives of such heterocyclics and mixtures thereof. Amines having more than one nitrogen group are preferred and imidazoline such as that prepared from the reaction of a tall oil fatty acid with diethylenetriamine is most preferred.

U.S. Pat. No. 4,316,810 to Burnham is directed to a fracturing composition which is an aluminum salt of an oxaalkyl phosphate in an oil base liquid. Surface active agents are not disclosed.

U.S. Pat. No. 4,153,649 to Griffin is directed to the reaction product of a hydroxy ether and a pentavalent phosphorus compound and an alcohol. The hydroxy ether has the formula $ROR_1OH$ wherein R is a $C_1$ to $C_6$ alkyl group, $R_1$ is a $C_2$ or $C_3$ alkylene group and the total carbon atoms of $R_1$ and R range from 3 to about 8. The disclosed reaction product may be employed in the gelling of hydrocarbon liquids when used with a compound containing a multivalent metal cation.

U.S. Pat. No. 5,271,464 to McCabe is directed to a method of plugging or sealing a subterranean formation by introducing a rapidly gelling hydrocarbon thereto. To the hydrocarbon is added a first component which is an at least partially neutralized alkyl orthophosphate ester and a second component which is the reaction product of an aqueous source of aluminum or ferric ions and a $C_8$–$C_{18}$ surface active amine in the presence of a water miscible organic solvent. The surface active amine is as defined above for European Pat. Application No. 551021A1, also to McCabe. The water miscible organic solvent is generally a monohydric alcohol.

U.S. Pat. No. 3,494,949 to Monroe et al. is directed to an additive for improving the viscosity of motor oils which is generally an aluminum salt of an alkyl orthophosphate.

U.S. Pat. No. 2,983,678 to Pellegrini et al. is directed to an additive for lubricating oils which is generally a rare earth metal salt of a diester phosphate.

While a variety of systems are available for gelling hydrocarbon liquids for the applications discussed above, there exists a clear need in the art for a means of improving the known systems to achieve decreased gelling times and improved viscosity.

SUMMARY OF THE INVENTION

Therefore, it is one object of the present invention to provide such a mean s for improving known gellation systems.

It is a further object of the present invention to provide a novel gellation system exhibiting decreased gelling times and improved viscosity.

It is yet another object of the present invention to provide a composition for decreasing gelling time and improving viscosity for use in conventional methods of gelling hydrocarbon liquids.

These as well as other objects are achieved by providing an enhancer for improving the gelling of hydrocarbon liquids with phosphate esters and crosslinking agents, said enhancer comprising an oxyalkylated amine.

Such objects are also achieved by providing a method of gelling hydrocarbon liquids which involves adding to a hydrocarbon liquid (a) a phosphate ester; (b) a crosslinking agent; and (c) an enhancer comprising an oxyalkylated amine.

Such objects are further achieved by providing a method of gelling hydrocarbon liquids which involves adding to a hydrocarbon liquid (a) an ether phosphate ester; (b) a crosslinking agent; and (c) an enhancer which is a $C_2$–$C_{22}$ amine.

Such objects are still further achieved by providing an enhancer for improving the gelling of hydrocarbon liquids with ether phosphate esters and crosslinking agents, said enhancer comprising a $C_2$–$C_{22}$ amine.

DESCRIPTION OF THE PREFERRED EMBODIMENTS

Generally, the present invention is related to an enhancer for use in the gelling of hydrocarbon liquids when such a liquid is treated with a phosphate ester and a crosslinking agent. Specifically, the present invention is directed to the gel which results from adding to a hydrocarbon liquid a phosphate ester, a crosslinking agent and an enhancer.

Hydrocarbon liquids which are appropriate for use in accordance with the present invention include kerosene, diesel oil and crude oil, gasoline and other aliphatic and aromatic hydrocarbons such as octane, heptane, paraffinic oils and lubricating oils. Generally, kerosene is the preferred; but, the hydrocarbon liquid chosen for use in accordance with the present invention will depend on the end-use application.

The crosslinking agent or activator employed is generally the salt of a multivalent cation, preferably the salt of a multivalent metal cation. Although a wide variety of metal salts, such as aluminum salts and rare earth metal salts, are within the scope of the present invention, ferric salts are generally preferred. Preferred ferric salts include ferric nitrate and ferric sulfate.

The phosphate ester of the present invention is generally the reaction product of a pentavalent phosphorus compound and an alcohol. It is preferred that an oxyalkene such as oxyethylene, oxypropylene or oxybutylene is also present as a reactant in order to yield an ether phosphate ester. Accordingly, the term "phosphate ester" as used herein includes ether phosphate esters such as described below. The phosphate ester of the present invention will thus contain one or more of the following structures:

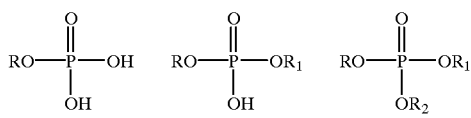

wherein R, $R_1$, and $R_2$ are independently $C_1$–$C_{18}$ alkyl, $C_6$ aryl, $C_1$–$C_{12}$ alkyl or dialkyl $C_6$ aryl, $C_1$–$C_{18}$ alkyl ether, $C_6$ aryl ether, or $C_1$–$C_{18}$ alkyl or dialkyl $C_6$ aryl ether where any R, $R_1$, or $R_2$ $C_1$–$C_{18}$ alkyl ether or $C_6$ aryl ether group has the following structures, respectively

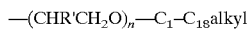

and

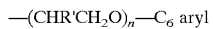

wherein R' is hydrogen, methyl or ethyl and n is an integer from 1 to 100.

Generally, it is preferred that the phosphate ester of the present invention is non-neutralized. However, depending on the enhancer employed, it is also within the scope of the invention to at least partially neutralize the phosphate ester.

The enhancer of the present invention is generally an amine and is preferably an oxyalkylated amine. The following structures are within the scope of the enhancer of the present invention:

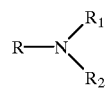

where R, $R_1$, and $R_2$ are independently hydrogen, $C_1$–$C_{18}$ alkyl, $C_5$–$C_6$ cycloalkyl, or

wherein R' is hydrogen, methyl or ethyl and n is an integer from 1 to 100;

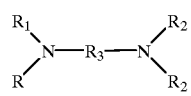

where R is $C_1$–$C_{18}$ alkyl, $R_1$ is hydrogen, $C_1$ alkyl or

wherein R' is hydrogen, methyl or ethyl and n is an integer from 1 to 100, $R_2$ is hydrogen or

wherein R' is hydrogen, methyl or ethyl and n is an integer from 1 to 100 and $R_3$ is $C_3$ alkyl; or

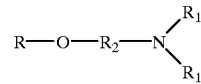

where R is $C_6$–$C_{18}$ alkyl, $R_1$ is hydrogen or

wherein R' is hydrogen, methyl or ethyl and n is an integer from 1 to 100, and $R_2$ is $C_3$ alkyl.

Thus, preferred oxyalkylated amines include oxyalkylated alkyl amines such as ethoxylated alkyl amines having from 1 to about 100 moles of ethylene oxide per mole of amine and ethoxylated alkyl amines having from about 4 to about 18 carbon atoms in the alkyl group; polyoxypropylene alkyl amine having from 1 to about 100 moles of propylene oxide per mole of amine; and polyoxybutylene alkyl amine having 1 to about 100 moles of butylene oxide per mole of amine. Also within the scope of the oxyalkylated alkyl amines of the present invention are oxyalkylated dialkyl amines such as ethoxylated dialkyl amines having from 1 to about 100 moles of ethylene oxide per mole of amine; polyoxypropylene dialkyl amine having from about 1 to about 100 moles of propylene oxide per mole of amine; and polyoxybutylene dialkyl amine having from about 1 to about 100 moles of butylene oxide per mole of amine. Also within the scope of the oxyalkylated amines of the present invention are oxyalkylated diamines. Oxyalkylated aryl amines are also within the scope of the present oxyalkylated amines.

Blends are also appropriate for use as the enhancer of the present invention. Preferred blends include at least one oxyalkylated amine as set forth above with a further amine or with a non-nitrogen containing component. It should be noted that blends containing more than two components are also within the scope of the present invention. A further amine appropriate for use in the enhancer blend may be chosen from oxyalkylated amines such as those set forth above or alkyl amines such as $C_2$–$C_{22}$ alkyl amines, dialkyl amines, alkyl diamines, dialkyl diamines, or dialkyl aminoalkylamines. Non-nitrogen containing components which are appropriate in the present blend include oxyalkylated ethers, oxyalkylated glycerides, oxyalkylated esters and oxyalkylated alcohols as well as non-oxyalkylated alcohols and phenols.

The following examples set forth in Table I are representative of gelling systems in accordance with the present invention. For each of the examples below, 200 milliliters of kerosene was placed in a 500 ml Waring blender having a standard stirring assembly. The blender was plugged into a rheostat set at 30% output. The blender was started. The type and amount of activator and phosphate ester and system enhancer set forth below were added to the kerosene. Where a system enhancer was employed in accordance with the present invention, 0.21 milliliters were added. The blender was stirred until the vortex created from the agitator closed. If the vortex had not closed after 120 seconds, the blender was stopped at that point. The kerosene gel was then poured into a Marsh funnel viscometer. The time required for 100 milliliters of the gelled kerosene to flow through the viscometer is set forth for each example, below.

The specific components employed in each of the following examples are:

Enhancers:

Am-1: an ethoxylated $C_{16}$–$C_{18}$ alkyl amine having two moles of oxyethylene per mole of amine;

Am-2: an ethoxylated $C_8$ alkyl amine having two moles of oxyethylene per mole of amine;

Am-3: an ethoxylated di-$C_4$ alkyl amine having one mole of oxyethylene per mole of amine;

Am-4: an ethoxylated $C_{12}$–$C_{14}$ alkyloxy $C_3$ alkyl amine having three moles of oxyethylene per mole of amine;

Am-5: N,N-di-$C_1$ alkyl $C_{16}$ alkyl amine;

Am-6: N,N-di ($C_1$) alkyl $C_{18}$ alkyl amine;

Am-7: $C_{16}$–$C_{18}$ imidazoline prepared from tall oil fatty acid and diethylenetriamine;

Am-8: an alkoxylated $C_{16}$–$C_{18}$ alkyl amine having six moles of oxypropylene per mole of amine;

Am-9: an ethoxylated di-$C_4$ alkyl amine having ten moles of oxyethylene per mole of amine;

Am-10: an alkoxylated $C_{16}$–$C_{18}$ alkyl diamine having three moles of oxypropylene per mole of diamine;

Am-11: N,N-di-$C_4$ alkyl amine;

Am-12: an alkoxylated $C_{16}$–$C_{18}$ alkyl amine having two moles of oxybutylene per mole of amine;

Am-13: an alkoxylated di-$C_4$ alkyl amine having one mole of oxybutylene per mole of amine;

Am-14: an alkoxylated di-$C_4$ alkyl amine having one mole of oxypropylene per mole of amine;

Am-15: dimethylaminopropylamine;

Am-16: aminomethylpropanol;

Am-17: an ethoxylated aniline having two moles of oxyethylene per mole of benzamine;

Gl-1: an ethoxylated tri-$C_{18}$ alkyl glyceride having five moles of oxyethylene per mole of glyceride;

Et-1: an ethoxylated $C_{12}$–$C_{14}$ alkyl ether having three moles of oxyethylene per mole of ether;

Es-1: an ethoxylated unsaturated $C_{16}$–$C_{18}$ fatty acid having three moles of oxyethylene per mole of fatty acid;

Ph-1: phenol;

Ph-2: $C_5$ di-tertiary-alkyl phenol;

Al-1: isodecyl alcohol.

Phosphate Esters:

PE-1: $C_2$, $C_8$, $C_{10}$ alkyl phosphate;

EP-1: $C_2$, $C_8$, $C_{10}$ alkyl, $C_6$ aryl ether (one mole of oxyethylene per mole of $C_6$) phosphate ester having an alkyl/aryl composition of 31% $C_2$, 25% $C_8$, 30% $C_{10}$, 14% ethoxylated aryl.

Crosslinking Agents:

Fe3+: a 60% solution of ferric sulfate;

Al3+: an aluminum chloride solution in accordance with U.S. Pat. No. 5,271,464.

TABLE I

EXAMPLES

| Ex. | Enhancer | Phosphate | Salt | Closure secs. | Viscosity mins. |
|---|---|---|---|---|---|
| 1 Comp. | none | PE-1 (1 ml) | Fe3+ (1 ml) | >120 | 0.6 |
| 2 | Am-1, Am-3 (80%/20%) | PE-1 (1 ml) | Fe3+ (0.79 ml) | 3 | 32.5 |
| 3 | Am-1, Am-3 (80%/20%) | EP-1 (1 ml) | Fe3+ (0.79 ml) | 2 | 150 |
| 4 Comp. | none | EP-1 (1 ml) | Fe3+ (1 ml) | >120 | 1.28 |
| 5 Comp. | none | PE-1 (0.77 ml) | Al3+ (1 ml) | 79 | 2.28 |
| 6 | Am-1, Am-3 (80%/20%) | PE-1 * (0.77 ml) | Fe3+ (0.79 ml) | 45.7 | 39 |
| 7 Comp. | none | PE-1 * (1 ml) | Fe3+ (1 ml) | >120 | 8.5 |
| 8 | Am-2, Am-3 (80%/20%) | PE-1 (1 ml) | Fe3+ (0.79 ml) | 30 | 95 |
| 9 | Am-8, Am-9 (80%/20%) | EP-1 (1 ml) | Fe3+ (0.79 ml) | >120 | 5 |
| 10 | Am-3, Am-10 (80%/20%) | EP-1 (1 ml) | Fe3+ (0.79 ml) | >120 | 15.5 |
| 11 | Am-1, Am-11 (80%/20%) | EP-1 (1 ml) | Fe3+ (0.79 ml) | 3.7 | >210 |
| 12 | Am-12, Am-3 (80%/20%) | EP-1 (1 ml) | Fe3+ (0.79 ml) | >120 | >150 |
| 13 | Am-3, Gl-1 (80%/20%) | EP-1 (1 ml) | Fe3+ (0.79 ml) | >120 | 74 |
| 14 | Am-3, Et-1 (80%/20%) | EP-1 (1 ml) | Fe3+ (0.79 ml) | 90 | 52 |
| 15 | Am-1, Am-13 (80%/20%) | EP-1 (1 ml) | Fe3+ (0.79 ml) | 4 | 52 |
| 16 | Am-1, Am-14 (80%/20%) | EP-1 (1 ml) | Fe3+ (0.79 ml) | 3 | 240 |
| 17 | Am-3, Es-1 (80%/20%) | EP-1 (1 ml) | Fe3+ (0.79 ml) | 90 | 88 |
| 18 | Am-4, Am-3 (80%/20%) | EP-1 (1 ml) | Fe3+ (0.79 ml) | 4.8 | 360 |
| 19 | Am-3, Am-5 (80%/20%) | EP-1 (1 ml) | Fe3+ (0.79 ml) | 2 | 900 |
| 20 | Am-3, Ph-1 (80%/20%) | EP-1 (1 ml) | Fe3+ (0.79 ml) | >120 | 60 |
| 21 | Am-3, Al-1 (80%/20%) | EP-1 (1 ml) | Fe3+ (0.79 ml) | 95 | 35 |
| 22 | Am-3, Am-15 (80%/20%) | EP-1 (1 ml) | Fe3+ (0.79 ml) | 90 | 300 |
| 23 | Am-3, Ph-2 (80%/20%) | EP-1 (1 ml) | Fe3+ (0.79 ml) | >120 | 37 |
| 24 | Am-3, Am-6 (80%/20%) | EP-1 (1 ml) | Fe3+ (0.79 ml) | 3 | 720 |
| 25 | Am-1, Am-16 (80%/20%) | EP-1 (1 ml) | Fe3+ (0.79 ml) | 7.5 | 180 |
| 26 | Am-1, Am-17 (80%/20%) | EP-1 (1 ml) | Fe3+ (0.79 ml) | 10.7 | 240 |
| 27 Comp. | Am-7 | EP-1 (1 ml) | Fe3+ (0.79 ml) | >120 | 0.12 |

The asterisk (*) in the phosphate column of Example 6 and Comparative Example 7 indicates that the phosphate esters of those examples were partially neutralized.

Generally, gelling systems in accordance with the present invention demonstrate increased gelling speeds as compared to prior art systems. Of the comparative examples set forth hereinabove only Comparative Example 5 has a gel closure time of less than 120 seconds. Only about one fourth of the examples of the invention required more than 120 seconds to achieve gel closure.

However, the more dramatic difference between the examples of the present invention and those of the prior art can be seen in the viscosity of the gels. None of the prior art examples exceeded a viscosity of 10 as measured in minutes required for 100 milliliters of gel to pass through a Marsh funnel. In fact, of the four prior art examples given four were of such a low viscosity that less than three minutes were required for 100 milliliters of gel to pass through the funnel.

Of the present examples of the invention, however, only one demonstrated a viscosity requiring less than 10 minutes for 100 milliliters of gel to pass through the funnel and nearly half of the inventive examples demonstrated a viscosity requiring in excess of 100 minutes for 100 milliliters to pass through the funnel.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

We claim:

1. A gelling composition for fracturing formations comprising: a) a hydrocarbon liquid capable of gellation, b) a phosphate ester, c) a crosslinking agent, and d) an enhancer comprising i) an oxyalkylated amine selected from the group consisting of ethoxylated alkyl amines, propoxylated alkyl amines, and butoxylated alkyl amines; ii) an oxyalkylated dialkyl amine selected from the group consisting of ethoxylated dialkyl amines, propoxylated dialkyl amines, and butoxylated dialkyl amines, or mixtures thereof.

2. The composition according to claim 1 wherein said enhancer is an ethoxylated, propoxylated, or butoxylated alkyl amine.

3. The composition according to claim 2 wherein said enhancer is an ethoxylated alkyl amine containing from 1 to about 100 moles of ethylene oxide per mole of amine.

4. The composition according to claim 3, wherein the alkyl of said ethoxylated alkyl amine contains from about 4 to about 18 carbon atoms.

5. The composition according to claim 2 wherein said enhancer is a propoxylated alkyl amine containing from 1 to about 50 moles of propylene oxide per mole of amine.

6. The composition according to claim 2 wherein said enhancer is a butoxylated alkyl amine containing from 1 to about 100 moles of butylene oxide per mole of amine.

7. The composition according to claim 1 wherein said enhancer is an ethoxylated, propoxylated, or butoxylated dialkyl amine.

8. The composition according to claim 7 wherein said enhancer is an ethoxylated dialkyl amine containing from 1 to about 50 moles of ethylene oxide per mole of amine.

9. The composition according to claim 7 wherein said enhancer is a polyoxypropylene dialkyl amine.

10. The composition according to claim 7 wherein said enhancer is a polyoxybutylene dialkyl amine.

11. A gelling composition for fracturing formations comprising: a) a hydrocarbon liquid capable of gellation, b) a phosphate ester, c) a crosslinking agent, and d) an enhancer comprising an oxyalkylated diamine.

12. A gelling composition for fracturing formations comprising: a) a hydrocarbon liquid capable of gellation, b) a phosphate ester, c) a crosslinking agent, and d) an enhancer comprising an oxyalkylated aryl amine.

13. The composition according to claim 1 wherein said enhancer further comprises a non-nitrogen containing component selected from the group consisting of oxyalkylated ethers, oxyalkylated glycerides, oxyalkylated esters and oxyalkylated alcohols.

14. The composition according to claim 13 wherein said non-nitrogen containing component is selected from the group consisting of alcohols and phenols.

15. The composition according to claim 1 wherein said crosslinking agent is a salt of a multivalent cation.

16. The composition according to claim 15 wherein said crosslinking agent is selected from the group consisting of ferric nitrate and ferric sulfate.

17. The composition according to claim 1 wherein said phosphate ester is of the formulae

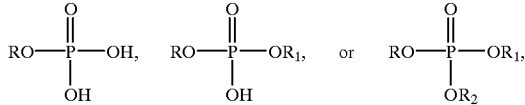

wherein R, $R_1$, and $R_2$ are independently $C_1$–$C_{18}$ alkyl, $C_6$ aryl, $C_1$–$C_{12}$ alkyl or dialkyl $C_6$ aryl, $C_1$–$C_{18}$ alkyl ether, $C_6$ aryl ether, or $C_1$–$C_{18}$ alkyl or dialkyl $C_6$ aryl ether, wherein any of R, $R_1$, and $R_2$ being said $C_1$–$C_{18}$ alkyl ether, $C_6$ aryl ether or $C_1$–$C_{18}$ alkyl or dialkyl $C_6$ aryl ether, having the following structures respectively:

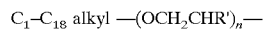

and

wherein R comprises a hydrogen or a $C_1$–$C_2$ alkyl group, and n is an integer from 1 to 100.

18. The composition according to claim 17 wherein said phosphate ester is an ether phosphate ester.

* * * * *